Patented Feb. 5, 1946

2,393,967

UNITED STATES PATENT OFFICE 2,393,967

PROCESS FOR POLYMERIZING TETRAFLUOROETHYLENE

Merlin Martin Brubaker, Boothwyn, Pa., assignor to E. I. du Pont de Nemours & Company, Wilmington, Del., a corporation of Delaware No Drawing. Application December 24, 1942, Serial No. 470,097

9 Claims. (Cl. 260—80)

This invention relates to polymeric materials and more particularly to a process for polymerizing tetrafluoroethylene.

This application is a continuation-in-part of my application Serial No. 439,909, filed April 21, 1942.

It is known that tetrafluoroethylene can be polymerized by allowing it to stand under superatmospheric pressure at room temperature for a considerable period of time. The polymerization can be accelerated by the presence of certain catalysts, such as silver nitrate in the presence of methanol. However, the best time yield reported for the polymerization under these conditions is 29%, based on the monomer present, after a polymerization time of three days at 25° C.

This invention has as an object a rapid and economical process for the polymerization of tetrafluoroethylene. A further object is a method for producing this polymer which will give high yields, based on the monomer present, in a short period of time. A still further object is a process for the manufacture of polymerized tetrafluoroethylene in a continuous manner. Other objects will appear hereinafter.

The above objects are accomplished by a procedure, described in more detail below, which consists in contacting tetrafluoroethylene under polymerizing conditions with water.

The polymerization reaction described herein can be carried out at temperatures as low as about 0° C. to a temperature of about 200° C. The process is best carried out in the range of 20° to 100° C. where the reaction occurs smoothly and rapidly. The process is operable at any pressure from one atmosphere up to the pressure that available apparatus will stand, as for example 1000 atmospheres. The rate at which the polymerization takes place, other things being constant, is roughly dependent on the reaction pressure. For example, in the neighborhood of 1–2 atmospheres the polymerization is considerably slower and requires several hours more to approach completion than at the preferred pressures in the range of 20 to 200 atmospheres at which a high yield of polymer is obtained in one hour or less. When proper means for dissipating the heat liberated in the polymerization reaction are provided, it may be carried out at much higher pressures, for example, at least 1000 atmospheres. The higher the pressure the more rapid is the reaction rate, and the more efficient must be the facilities for removing the heat of the reaction.

A preferred procedure for carrying out the reaction consists in charging a pressure reactor with an aqueous solution containing about 0.1% of an alkali or ammonium persulfate and 0.5–10% of an alkaline buffer such as borax, evacuating the reactor to remove the major portion of the atmospheric oxygen, and then charging with monomeric tetrafluoroethylene as a liquid or a gas under pressure. The reactor is charged to a pressure of 20 atmospheres or higher and is then agitated and heated to about 80° C. The polymerization reaction is indicated by a pressure drop, and will proceed to completion in the presence of 0.003 molecular equivalents of catalyst per equivalent of tetrafluoroethylene in less than an hour. A quantitative yield of white granular polymer is obtained.

The reaction pressure, however, can be maintained by the addition as the reaction proceeds of more tetrafluoroethylene which facilitates control of the reaction. Under such conditions the polymerization takes place rapidly and smoothly. A valuable advantage of the present process resides in the fact that it can be carried out in a continuous manner.

The polymer obtained in accordance with the procedure outlined above is a white granular solid. It is insoluble in all solvents and impervious to the attack of acids and alkalies, including sulfuric, nitric, hydrochloric, and hydrofluoric acids, and 40% aqueous caustic. It is thermostable up to at least 500° C. and can be pressed and molded at temperatures above 300° C. It has a density of approximately 2.2 and a refractive index of approximately 1.3 (soduim D line).

The practice of this invention is further illustrated by the following examples in which the parts are by weight:

Example I

A stainless steel pressure reactor is charged with a solution containing 0.2 part of potassium persulfate, 0.5 part of borax in 100 parts of water, the charge occupying 25% of the reactor volume. The reactor is closed, evacuated, and charged with 30 parts of tetrafluoroethylene under pressure. The reactor is agitated and heated to 80° C. for one hour, then cooled. There is no pressure left in the reactor when it is cooled to room temperature. There is obtained 26 parts of white, granular polytetrafluoroethylene.

Example II

A silver-lined pressure reactor is charged with a solution containing 0.2 part of ammonium persulfate and 1.5 parts of borax in 100 parts of water, the charge occupying 25% of the reactor volume. The reaction mixture has a pH of 9.2.

The reactor is closed, evacuated to remove atmospheric oxygen, and charged with 30 parts of tetrafluoroethylene. The reactor is agitated and heated to 80° C. for one hour, then cooled, and the contents discharged. There is no residual pressure left in the bomb at the end of the reaction period. The final reaction mixture has a pH greater than 7. There is obtained 30 parts of white, granular polytetrafluoroethylene.

Films can be pressed from this polymer by maintaining it at about 400° C. under 1000 lbs./sq. in. pressure for 5–10 minutes and then quenching. Such a film has a tensile strength of 2500 lbs./sq. in., based on the original dimensions. Thin strips of the film can be cold drawn 420%.

*Example III*

A sterling silver-lined, high-pressure reactor is charged with 100 parts of water, 0.2 part of ammonium persulfate, 2 parts of borax, and 200 parts of tetrafluoroethylene. The reactor is agitated and heated at 50° C. for six hours. There is obtained 194 parts of polytetrafluoroethylene. The aqueous phase of the reaction mixture has a pH of 8.0.

*Example IV*

A silver-lined pressure reactor is charged with 100 parts of water, 0.2 part of ammonium persulfate, and 25 parts of tetrafluoroethylene. The reactor is agitated and heated at 80° C. for six hours. There is obtained 4 parts of white granular polytetrafluoroethylene. The aqueous portion of the reaction mixture is acidic, in contrast to those cases in which an alkaline buffer is employed.

*Example V*

A stainless steel-lined high pressure reactor, equipped with an internal cooling coil and internal thermocouple, is charged with 700 parts of water, 0.7 parts ammonium persulfate, and 7 parts of borax. The reactor is then pressured at room temperature to 450 lbs./sq. in. with tetrafluoroethylene. The reactor is then agitated, heated to 60° C., and the pressure is increased to 800 lbs./sq. in. Polymerization sets in immediately, as indicated by a drop in pressure registered on the pressure gauge attached to the reactor. This pressure drop continues as the reaction proceeds, and is counteracted by the addition of tetrafluoroethylene from a storage source. The pressure is maintained in the range 675–800 lbs./sq. in. and the temperature in the range 60–63° C. over a period of five hours. The total pressure drop during this time is 1065 lbs./sq. in. The reactor is cooled, the pressure released, and the product is discharged. There is obtained 955 parts of white, granular polytetrafluoroethylene. The aqueous phase at the end of the reaction has a pH of 8.

*Example VI*

A stainless steel-lined high pressure reactor equipped with an internal cooling coil and thermocouple well is charged with 670 parts of water, 31.5 cc. of 0.2278 normal aqueous trimethylamine solution (0.424 parts of trimethylamine), 0.7 part ammonium persulfate, and 0.2 part of glacial acetic acid. The reactor is closed, evacuated, and charged to a pressure of 300 lbs./sq. in. with tetrafluoroethylene from a storage system. The reactor is then agitated, heated to 50° C. and the pressure is raised to 700 lbs./sq. in. by further injection of tetrafluoroethylene; the temperature is then carried up to 60° C. Reaction sets in immediately upon reaching 60° C., as indicated by a rapid pressure drop; the pressure is maintained in the range 500–800 lbs./sq. in. by intermittent injection of tetrafluoroethylene from the storage system through a control valve. The temperature meanwhile is maintained in the range 60°–66° C. In 30 minutes a total pressure drop of 1000 lbs./sq. in. has taken place and the reaction is stopped by rapid cooling. The excess tetrafluoroethylene is vented from the reactor, and the reactor is opened and the product discharged. There is obtained 750 parts of white polytetrafluoroethylene. The resulting aqueous solution has a pH of 3.

*Example VII*

A silver-lined high pressure reactor is charged with 300 parts of water and 2 parts of 30% aqueous hydrogen peroxide. It is then closed and evacuated and charged with 70 parts of tetrafluoroethylene. The reactor is heated at 60° C. and agitated for 17 hours. It is then cooled and the product is discharged. There is obtained 63 parts of white, granular polytetrafluoroethylene. The aqueous portion of the reaction mixture has a pH of 2.

*Example VIII*

A silver-lined high pressure reactor is charged with 200 parts of water. It is then closed, evacuated and charged with 200 parts of tetrafluoroethylene. The reactor is agitated and heated at 100° C. for 14 hours. It is then cooled, the pressure is released and the product is discharged. There is obtained 2 parts of polytetrafluoroethylene.

In view of the highly exothermic nature of the tetrafluoroethylene polymerization reaction it is necessary to remove the heat of reaction as rapidly as possible if the reaction is to be kept under control. The polymerization process of this invention, by providing means for the removal of the heat of the reaction through the use of water as a diluent, makes it possible to exercise accurate control of the reaction without the necessity of having to provide special means for dissipating the heat of the reaction. The greater ease of control of the reaction makes the present process more readily adaptable to large scale operation and hence more practical than the prior art process for the polymerization tetrafluoroethylene. Water is a particularly suitable medium for the dissipation of the heat of reaction because it has a high specific heat and because it does not participate as a reactant in the polymerization process. The presence of water in the reaction mixture results in the maintenance of more uniform reaction temperatures throughout the reaction vessel, particularly when the reactor is provided with a means for agitation. This, in turn, leads to the production of polymer of improved properties having a high degree of homogeneity, i. e., the tendency of the polymer to form into small granular particles instead of large chucks is increased. The presence of water in the reaction vessel is particularly important when the reaction is carried out on a large scale since the possibility of local overheating with the resultant danger of rupturing the reaction vessel is essentially eliminated. Since the polymer, when prepared in accordance with the process of this invention, is obtained in the form of small granular particles, it can be readily removed from the reactor, either with or without the addition of a surface-active agent. When the polymer is prepared in the absence of water, it is obtained in the form of chunks which cannot be readily removed from the reaction vessel or converted into a slurry by the addition of water and a surface-active agent. Another advantage for the use of water in the polymerization reaction is that water is a solvent for inorganic peroxy compounds, e. g. the persulfates, which constitute the preferred catalysts. These catalysts are most effective when used in aqueous solution.

The water is best used in amounts such that an aqueous phase is present, one part of water to about two parts of tetrafluoroethylene being particularly useful. However, the ratio of water to tetrafluoroethylene can be varied widely but will generally be in the range from 1:20 to 20:1.

Example VIII illustrates the polymerization of tetrafluoroethylene in the presence of water without the addition of a catalyst. It is, however, preferable to add to the reaction mixture a polymerization-favoring catalyst in order to obtain high yields of polytetrafluoroethylene in short periods of time. Catalysts which are particularly suitable for the polymerization of tetrafluoroethylene are the inorganic peroxy compounds, i. e., those containing the peroxy linkage, 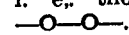.

The inorganic peroxy compounds which are useful as catalysts in the practice of this invention comprise salts of true per-acids, such as persulfates, perphosphates, percarbonates, and perborates, as well as other inorganic peroxides, such as hydrogen peroxide and substitution products derived from hydrogen peroxide, for example, barium peroxide, zinc peroxide, etc. Particularly valuable are the water-soluble salts of those peracids, such as the sodium, potassium, calcium, barium, and ammonium salts of persulfuric and perphosphoric acids, which may be prepared by the electrolytic oxidation of salts of the corresponding oxy acids. The persulfates, and especially the alkali and ammonium persulfates, are preferred since they are highly effective in the present process and since they are readily available and inexpensive. Modifiers, such as sodium bisulfite, sodium hydrosulfite and trimethylamine may be employed to increase the effectiveness of the catalyst. It is preferred to employ the catalyst in the amount ranging from 0.01 to 1 mol per cent based on tetrafluoroethylene employed. However, excellent results are obtained using catalyst concentrations as low as 0.001 mol per cent.

It is within the scope of the invention to include in the reaction mixture organic compounds, such as alcohols, acids, ethers, amines, hydrocarbons, ketones, esters, nitriles, etc. For example, the reaction may be run in a mixture comprising water and another liquid, such as ethanol, acetic acid, dioxane, methylamine, isooctane, cyclohexanone, ethyl propionate, acetonitrile, etc. The organic solvent may be miscible, partly miscible, or immiscible with water. The ratio of such solvents to water is immaterial so long as there is sufficient water present to provide an aqueous phase.

It is also within the scope of this invention to employ dispersing agents, especially when water-immiscible solvents are added to the reaction mixture, thereby facilitating the production of a finely divided polymer suspension.

Finely divided solids which serve as fillers can be included in the polymerization mixture, and the polymerization can be carried out in the presence of these. As examples of such there may be mentioned pigments, such as titanium oxide and carbon black, metals, such as copper powder, and other finely divided materials which are insoluble in the components of the reaction system.

It is often advantageous to avoid radical changes in pH during the course of polymerization of tetrafluoroethylene when carried out in an aqueous system. In order to avoid such changes it is preferable, although not essential, to include in the polymerization mixture small amounts of materials which have a buffering action on the pH and prevent such radical changes. Since the polymerization can be carried out satisfactorily in either an acid or an alkaline medium, many types of buffering agents are operable. For example, an alkaline pH can be maintained by the use of such buffers as borax, disodium phosphate, sodium carbonate, ammonium carbonate, formamide, and sodium acetate. For a pH below 7, such media as acetic acid, propionic acid, and other organic acids and monosodium phosphate, can be employed. In some instances, it is desirable to have a low pH, e. g. 2, at the onset of and during the reaction, in which case strong acids, such as hydrochloric and sulfuric acids may be added to the reaction charge in small amounts.

The polymerization can, in general, be carried out in any apparatus which is capable of operating at the desired reaction pressure. It is desirable, however, to employ certain corrosion-resistant materials in the fabrication or lining of the reactor, thereby diminishing the chance of introducing metallic impurities into the polymer. This precaution is particularly important in the present instance since, because of the insolubility of the polymer, metallic impurities are particularly difficult to remove, once they are present. At the high temperatures required for fabrication of the polymer, metallic salts, particularly of iron, occasion discoloration. For this reason it is preferred to operate in a reactor fabricated of or lined with such materials as stainless steel, silver, tantalum, Hastelloy, or glass or other vitreous materials. However, for most purposes reactors constructed of mild steel are satisfactory.

The process of this invention can also be used for the preparation of copolymers of tetrafluoroethylene with a large variety of organic compounds containing multiple bonded carbon-carbon linkages. Typical examples of these materials are the monoethylenic hydrocarbons such as ethylene and styrene; halogenated hydrocarbons such as vinyl chloride, vinyl fluoride, 1,1-dichloroethylene, 1,1-difluoroethylene, and triflurochloroethylene; vinyl carboxylates such as vinyl acetate and vinyl benzoate; vinyl cyanide; derivatives of alpha, beta-unsaturated acids such as the esters of acrylic, methacrylic, maleic, and fumaric acids; and compounds containing more than one multiple bonded carbon-carbon linkage such as butadiene, 2-chloro-1,3-butadiene, cyclopentadiene, monovinylacetylene, divinylacetylene, and dialkylvinylethynyl carbinols.

The present invention provides a method for the economical production in high yields and in a short time of polymerized tetrafluoroethylene which has many valuable industrial applications because of its unusual chemical inertness. The polymer is advantageously employed as a liner for apparatus in which such corrosive materials as nitric acid, hydrofluoric acid, hydrochloric acid, alkalies, etc., are used, especially at elevated temperatures. The polymer can be made into flexible tubing which is well suited to the transport of corrosive liquids and gases. Gaskets and valve packing made of the polymer can likewise be employed to advantage where other materials fail to withstand corrosive attack or elevated temperature. Pump diaphragms of the polymer can be employed in the pumping of liquids having corrosive or solvent properties which preclude the use of other diaphragm materials. Polytetrafluoroethylene bearings are useful in many applications. Container closures, such as bottle cap liners, are also valuable because of their good sealing qualities and inertness to corrosive attack. Containers and vessels may be lined with polytetrafluoroethylene in order to provide said vessels with a completely inert lining.

Electrical conductors of all sorts can be insulated with polytetrafluoroethylene, such insulated conductors being particularly useful because of the inertness of the insulating polymer. For example, polytetrafluoroethylene insulated conductors in the form of wire can be used to wind the armatures of motors, especially motors which operate under heavy loads and high temperatures where resistance to oxidation conditions is important. Such insulated wire is particularly useful in winding the armatures of refrigeration motors, where the chemical stability of the insulated wire is necessary since the windings are contacted with chemically active refrigerants, such as sulfur dioxide and ammonia. Because of the fact that large uniform sheets of polytetrafluoroethylene are available, these can advantageously replace built-up mica as insulators for armature slots, commutator segments, and commutator V-rings. These applications are of particular advantage when it is desired subsequently to anneal the motor armature in order to obtain increased conductivity; because of the lack of heat stability of organic binders required in the manufacture of built-up mica, a motor containing this type of insulation cannot be heated to the annealing temperature of copper wire. Polytetrafluoroethylene coated wires can also be employed advantageously in the winding of transformer coils, and of induction coils. Such wires can also be used to advantage as ignition cables for internal combustion engines, particularly for airplanes and tanks, where extreme stability to oxidation, high temperature, and gasoline and lubricating oil is very important and in power and signal transmission. Such insulated wires are also extremely useful for electrical work in chemical plants because of their stability to all kinds of chemical attack.

Submarine and subterranean cables insulated with polytetrafluoroethylene are advantageous in that they have excellent electrical properties, and that the polymer has essentially no tendency to cold flow under the conditions of use. It provides a constant spacing between the conducting elements of the coaxial cables over a long period of time. Another advantage is that the cables are not subject to corrosion by salt water or by subterranean conditions.

Spark plugs, especially for aircraft motors, insulated with polytetrafluoroethylene instead of with mica or porcelain can be employed advantageously because of their resistance to vibration and to sudden shock, because of their excellent electrical properties even at high temperatures, and because the forms or shapes necessary for this type of insulation are readily obtainable by molding polytetrafluoroethylene which is not the case with mica. Sheets of polytetrafluoroethylene are also valuable as storage battery separators.

The insulated conductors of this invention find many electrical applications in radio apparatus, such as spacers, supports, bases and sockets for radio tubes, and particularly as a dielectric for radio, telephone, rectifier and high frequency condensers. Application of this insulation as a condenser dielectric is particularly advantageous especially in frequency modulation transmitters and receivers because of the extremely low power loss of such condensers over a wide range of temperatures and of frequencies, at either high or low humidities. Other uses in which the insulating properties of polytetrafluoroethylene are advantageous include forms for coils and resistors, spreaders and insulators for lead-in wires, and as coupling for high voltage transmitting shafts.

Other applications in which polytetrafluoroethylene is particularly valuable as an electrical insulating material include supports and films in transformers, supports for resistance heating elements, fuse plug windows, washers, bearings, bushings, gaskets, radio transmitting crystal holders, transposition blocks, condenser bases, strain and stand-off insulators, and spacers for coaxial cables.

As many apparently widely different embodiments of this invention may be made without departing from the spirit and scope thereof, it is to be understood that I do not limit myself to the specific embodiments thereof except as defined in the appended claims.

I claim:

1. A process for polymerizing tetrafluoroethylene which comprises contacting it, at a temperature of 0° to 200° C. under a pressure of at least one atmosphere, with water in a ratio of water to tetrafluoroethylene within the range from 20:1 to 1:20.

2. A process for polymerizing tetrafluoroethylene which comprises contacting it, at a temperature of 0° to 200° C. under a pressure of at least one atmosphere, with an inorganic peroxy compound and with water in a ratio of water to tetrafluoroethylene within the range from 20:1 to 1:20.

3. A process for polymerizing tetrafluoroethylene which comprises reacting at a temperature of 0° to 200° C. under a pressure of at least one atmosphere a mixture comprising tetrafluoroethylene, an alkaline agent, and an aqueous solution of an inorganic peroxy compound, said mixture containing water in a ratio of water to tetrafluoroethylene within the range from 20:1 to 1:20.

4. The process set forth in claim 3 in which said catalyst is a salt of a per-acid of a nonmetal.

5. The process set forth in claim 3 in which said catalyst is a persulfate.

6. The process set forth in claim 3 in which said catalyst is an alkali persulfate.

7. The process set forth in claim 2 in which the catalyst is ammonium persulfate, the temperature 20° C. to 100° C., and the pressure is from 20 to 200 atmospheres.

8. The process set forth in claim 2 in which the catalyst is hydrogen peroxide, the temperature 20° C. to 100° C., and the pressure is from 20 to 200 atmospheres.

9. The process set forth in claim 3 in which the catalyst is ammonium persulfate and the alkaline agent is borax.

MERLIN MARTIN BRUBAKER.